United States Patent [19]

Hartig

[11] 4,389,989
[45] Jun. 28, 1983

[54] ELECTRONIC ARRANGEMENT FOR IDLING STABILIZATION

[75] Inventor: F. Gunter Hartig, Karlsruhe, Fed. Rep. of Germany

[73] Assignee: Siemens Aktiengesellschaft, Fed. Rep. of Germany

[21] Appl. No.: 279,668

[22] Filed: Jul. 1, 1981

[30] Foreign Application Priority Data

Jul. 10, 1980 [DE] Fed. Rep. of Germany ....... 3026192

[51] Int. Cl.³ .............................................. F02D 5/04
[52] U.S. Cl. ..................................... 123/339; 123/418
[58] Field of Search ................................. 123/339, 418

[56] References Cited

U.S. PATENT DOCUMENTS

| | | | |
|---|---|---|---|
| 4,111,174 | 9/1978 | Fitzner et al. | 123/339 X |
| 4,244,336 | 1/1981 | Fitzner | 123/418 |
| 4,328,775 | 5/1982 | Ironside | 123/418 X |
| 4,338,899 | 7/1982 | Geiger et al. | 123/339 |

Primary Examiner—Tony M. Argenbright
Attorney, Agent, or Firm—Scully, Scott, Murphy & Presser

[57] ABSTRACT

An electronic arrangement for idling stabilization between a signal transmitter for ignition spark formation and an ignition device for internal combustion engines, by means of which, at a dropping engine rotational speed, the ignition timepoint is advanced below a first engine rotational speed, in which there presently is retarded a pulse obtained from the signal transmitter and, with regard to the contemplated unretarded pulse sequence, is transmitted as an advanced signal to the ignition device whereby the unretarded pulses are emitted externally of the stabilization range intermediate the first and a second lower engine rotational speed. The delay device essentially consists of a sawtooth generator which is triggered by a side of a pulse emitted from the signal transmitter, which is connected at the output thereof with a storage, as well as with an amplifier having a threshold switch, whose outputs are conducted to a comparator which is so correlated that, upon the exceeding of a value stored in the storage, a signal is emitted at the amplifier output which, after further processing, is conducted to the ignition device. Thereby, the operational behavior of simple constructional components and circuit groups is employed so as to achieve, at a falling engine rotational speed within the stabilization range, initially a constant delay period and thereafter an increasing delay period at a constant advance ignition.

4 Claims, 38 Drawing Figures

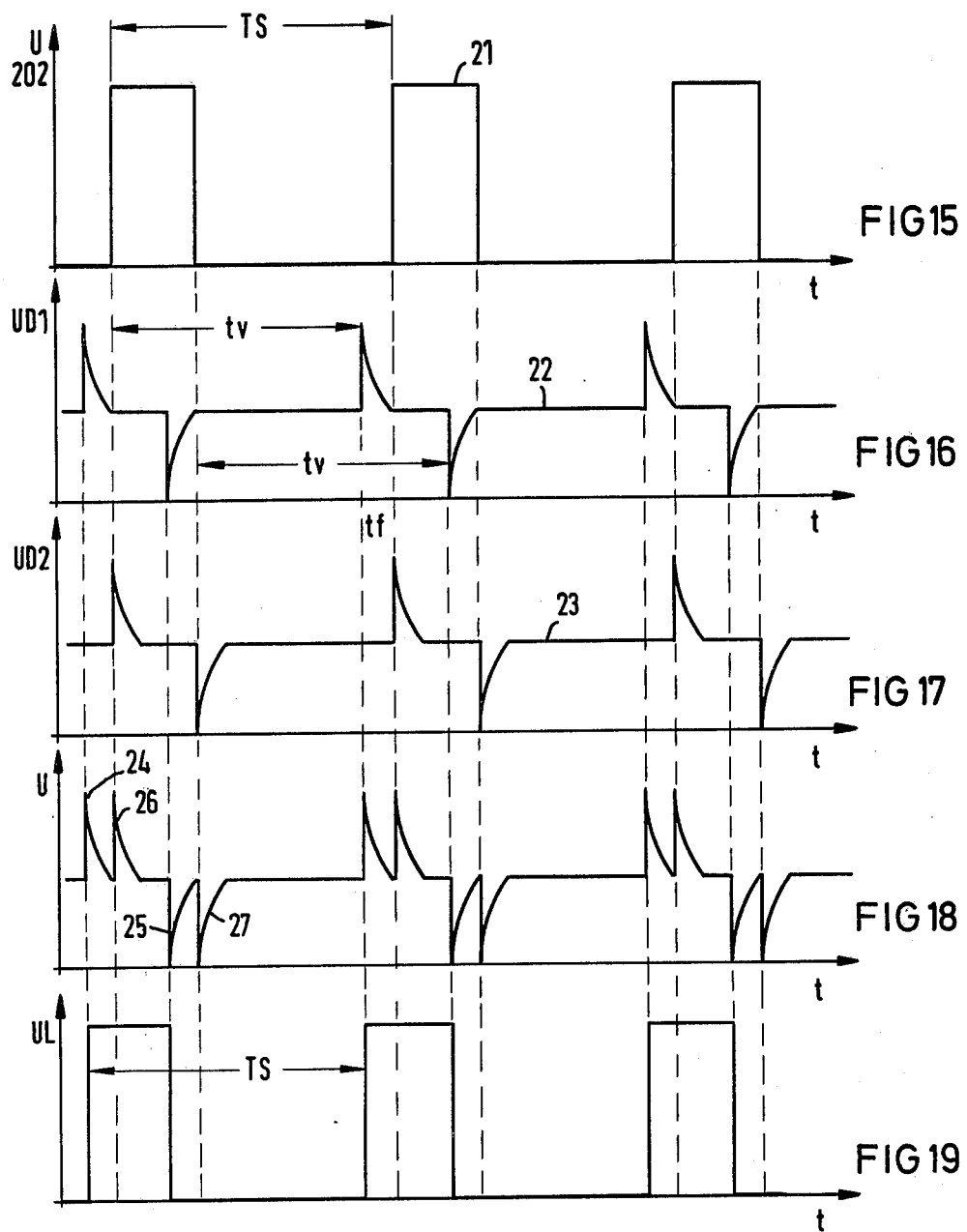

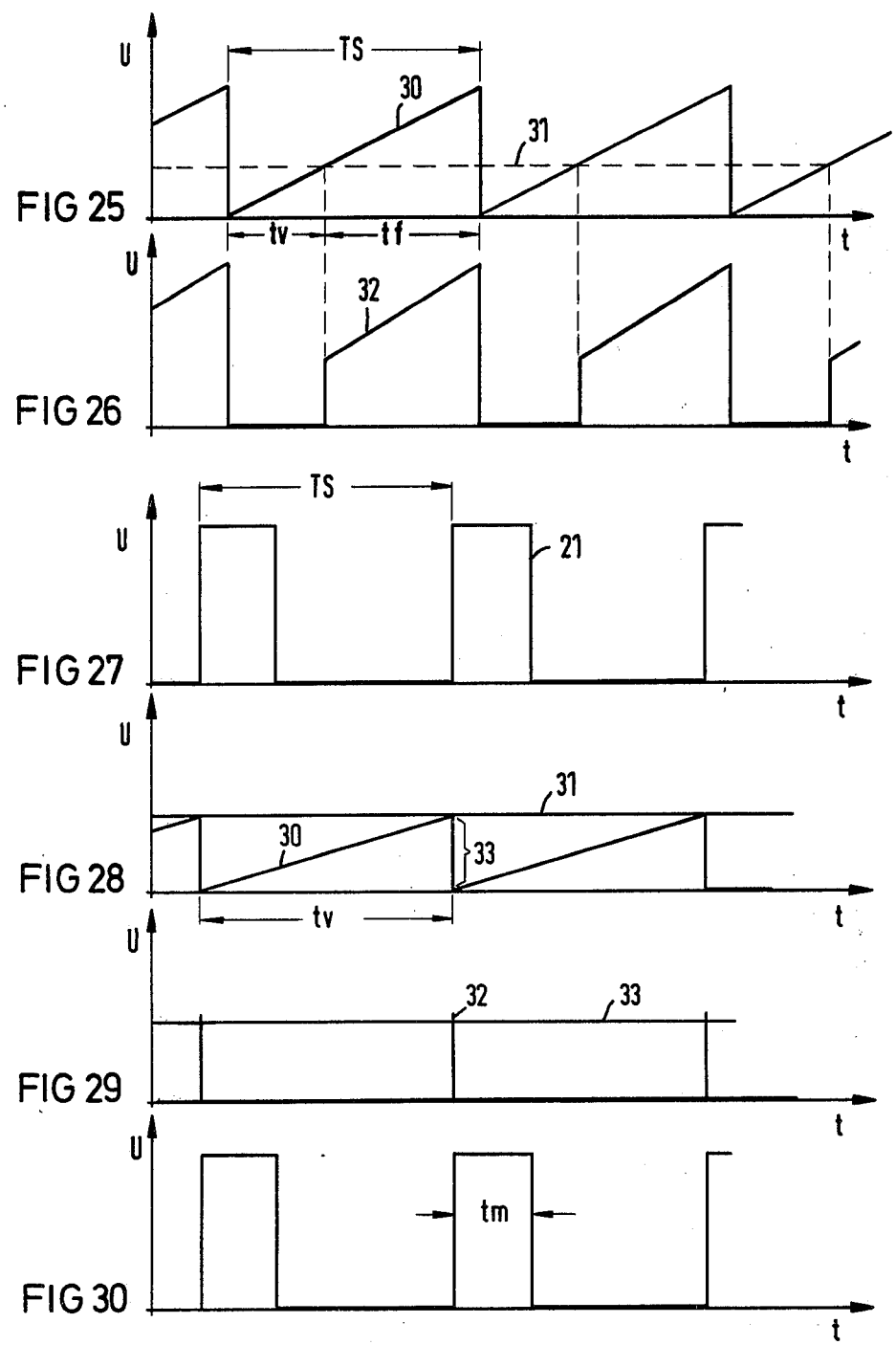

ELECTRONIC ARRANGEMENT FOR IDLING STABILIZATION

BACKGROUND OF THE INVENTION

1. Field of the Invention

The present invention relates to an electronic arrangement for idling stabilization between a signal transmitter for ignition spark formation, for instance a Hall generator, and an ignition device for internal combustion engines. Pursuant to the present invention, at a dropping engine rotational speed, the ignition timepoint is advanced below a first engine rotational speed, in which there presently is retarded a pluse obtained from the signal transmitter and, with regard to the contemplated unretarded pulse sequence, is transmitted as an advanced timing signal to the ignition device whereby the unretarded pulses are emitted externally of the stabilization range intermediate the first and a second lower engine rotational speed.

2. Discussion of the Prior Art

An arrangement for idling stabilization which is presently being marketed operates with a constant delay period over the entire stabilization range and, consequently at reducing engine rotational speed with an increasing advance ignition. Technologically, from the standpoint of the engine, such an operational characteristic is not satisfying. Operational characteristics are desirable in which the range having a constant delayed period, in essence with an increasing advance ignition, has an adjoining range with an increasing delay period and a constant advance ignition. Such an operational behavior of the stabilization device takes into consideration that, due to the engine characteristics curve, the initially increasing advance ignition produces a growing torque, and that during a further dropping rotational engine speed, a relatively retarded or held back advance ignition allows for an increase in the torque.

Through an idling stabilization arrangement it is possible to achieve a smooth running for a cold engine, as well as also for a warmed up engine, at the lowest fuel consumption. The desired operational cycle theoretically requires a high demand on components and circuit technology which renders the commercial success questionable.

SUMMARY OF THE INVENTION

Accordingly, it is an object of the present invention to effectuate the described sought after operational cycle through the intermediary of an electronic arrangement for idling stabilization which operates with relatively few constructional components and low demand on circuitry technology.

The foregoing object is achieved pursuant to the invention, in that the delay device essentially consists of a sawtooth generator which is triggered by an edge of a pulse emitted from the signal transmitter, which is connected at the output thereof with a storage, element such as a capacitor as well as with an amplifier having an element non-linear with respect to the voltage, for example a threshold switch in the feedback branch of the amplifier whose outputs are conducted to a comparator which is so correlated that, upon the exceeding of a value stored in the storage capacitor, a signal is emitted at the amplifier output which, after further processing, is conducted to the ignition device. Thereby, the operational behavior of simple constructional components and circuit groups is employed in an advantageous manner so as to achieve, at a falling engine rotational speed within the stabilization range, initially a constant delay period and thereafter an increasing delay period at a constant advance ignition. Since the sawtooth voltage requires a constant time period up to acceleration to the threshold value, there is initially achieved a constant delay. Above the threshold value the amplification, among other functional prerequisites, serves for an increasing delay and a constant advance ignition. Each amplification factor hereby corresponds to, as in the diagram, an advance in ignition above a predetermined plateau level of constant advance ignition above the engine rotational speed.

A particularly simple and advantageous processing of the signal emitted at the amplifier output evidences the feature that:

the comparator includes a differentiating element at the output thereof, that the output of the comparator is connected with a monostable flip flop, which includes a controlled switch whose control input is connected with the comparator, and which at the input side thereof is connected with the storage and at the output side with the input of the actual monostable flip flop, which contains a storage capacitor connected in parallel to its control input, which is bridged over by a discharge branch, and wherein the outputs of the monostable flip flop, which represent the outputs of the delay device, are connected with the input of a priority circuit, at whose further inputs there is produced a connection to the input of the electronic arrangement for idling stabilization. The priority circuit is so designed such that a signal at its input terminals from the monostable flip flop is conducted along to its output, and without such a signal the input which is connected to the input of the electronic idling stabilization will be connected with its output.

This result in a monostable pulse in the monostable flip flop which is influenced in its duration by the maximum value of the sawtooth in the storage capacitor behind the sawtooth generator. It is essential that the keying ratio remains constant from pulse to non-pulse. Thereby it becomes possible that from two edges of the pulse which is introduced from the signal transmittor, in essence, from the negative going and from the positive going edge to a lead off a triggering signal. The theoretically required demand on constructional elements and circuit technology is hereby further reduced, in actual practice, by about one-half.

In order to assure that a maximum stored valve is attained in a particular simple manner, it is advantageous when there are located between the input of the arrangement for electronic idling stabilization and the storage, capacitor in essence, the sawtooth generator, pick ups of a differentiating element for two short sequentially following pulses, wherein this differentiating element forms on its input side the input of the delay device. This arrangement assures that there can be recorded in the storage capacitor, shortly before the sawtooth generator begins to operate, whereby the voltage which is recorded from the sawtooth generator is a linear representation of the time interval between two trigger edges of the signal from the signal transmitter.

A particularly simple priority circuit comprises two differentiating elements of operative resistors, which are interconnected, whereby the arrangement, together with two inverters attached to the connecting location in series form a bistable flip flop, in that from one operative resistor there is formed one connection between the inverters and from the other operative resistor a connection at the output of the second inverter. Such a priority circuit can, in general, be advantageously utilized.

BRIEF DESCRIPTION OF THE DRAWINGS

The invention is now described in greater detail on the basis of the following exemplary embodiments, taken in conjunction with the accompanying drawings; in which:

FIGS. 15 through 19, which are illustrated in combination with each other, represent the interaction of the individual operational groups, as viewed from the priority circuit;

FIG. 15 illustrates a signal rendered available at the output of the Schmitt-trigger; in the illustration on the ordinate there is plotted the output voltage and the time on the abscissa;

FIG. 16 illustrates, in a manner similar to FIG. 15, the signal at the output of the first differentiating element in the priority circuit, in accordance with FIG. 5; represented thus is the signal which is delayed by the delay device;

FIG. 17 illustrates the voltage at the output of the second differentiating element in the priority circuit, which is directly connected to the output of the Schmitt-trigger pursuant to FIG. 4; there is thus represented the undelayed signal;

FIG. 18 illustrates the signals pursuant to FIGS. 16 and 17 at the input of the flip flop of the priority circuit;

FIG. 19 illustrates the voltage at the output of the flip flop of the priority circuit, in effect, at the output of the priority circuit; recorded on the ordinate is again the voltage and on the time on the abscissa;

FIG. 20 represents the signal at the output of the Schmitt-trigger with inverter, in essence, at the input of the delay device;

FIG. 21 illustrates the differentiated signal to the positive side of the signal pursuant to FIG. 20, which is available at the output 208 according to FIG. 2;

FIG. 22 illustrates the differentiated signal at the output 209 of the exemplary embodiment;

FIG. 23 represents the input voltage of the delay device;

FIG. 24 illustrates the voltage at the output of the sawtooth generator; on the abscissa there is again presently plotted the time and the voltage on the ordinate;

FIGS. 25 and 26, which act in combination, illustrate the operating principle of the threshold switch with the amplifier;

FIG. 25 represents the voltage at the output of the sawtooth generator;

FIG. 26 represents the voltage at the output of the amplifier with threshold switch;

FIGS. 27 through 33, which act in combination, illustrate the interplay of the essential constructional components in the delay device for the limiting condition of the commencing delay;

FIG. 27 represents the signal at the input of the delay device;

FIG. 28 illustrates the signal at the output of the sawtooth generator in conjunction with a preset threshold value for the threshold switch of the amplifier;

FIG. 29 represents the voltage at the output of the amplifier with threshold switch and, concurrently, the maximum voltage in the storage based upon the preceeding sawtooth signal; the amplifier thus just jumps on and is again deactivated;

FIG. 30 represents the signal at the output of the monostable flip flop, in effect, at the output of the delay device;

FIGS. 31 through 34, which act in combination, illustrate the interplay of the units in the delay device for the range of increasing delay;

FIG. 31 represents the signal at the input of the delay device, corresponding to FIG. 27;

FIG. 32 represents the signal at the output of the sawtooth generator at an indicated threshold value for the amplifier with threshold switch;

FIG. 33 represents the signal at the output of the amplifier with threshold switch, concurrently there is recorded the maximum voltage, which is stored in the storage, of the preceeding sawtooth as a parallel to the abscissa;

FIG. 34 represents the signal at the output of the monostable flip flop, in effect, at the output of the delay device;

FIG. 35 again illustrates the signal at the input of the delay device pursuant to FIG. 27;

FIG. 36 represents the voltage at the output of the sawtooth generator; illustrated in parallel with the abscissa as a linear is the threshold of the amplifier with threshold switch;

FIG. 37 again illustrates the signal at the output of the amplifier with threshold switch pursuant to FIG. 33; furthermore, plotted in parallel with the abscissa is the maximum sawtooth voltage stored in the storage; further shown as a square-wave pulse is the signal at the output of the comparator for a not-considered differentiating element; parallel to the abscissa there is further plotted in phantom a limit of the amplifier; above this limiting voltage the delay device no longer emits a signal so that the priority circuit will further transmit the undelayed signal from the signal transmitter; one is then found to be outside of the operating range of the electronic arrangement for the idling stabilization; and FIG. 38 illustrates the signal at the output of the delay device, in effect, at the input of the priority circuit; represented by tv and tv' are the delay times and by tf the advance ignition.

DETAILED DESCRIPTION

Figure 1:
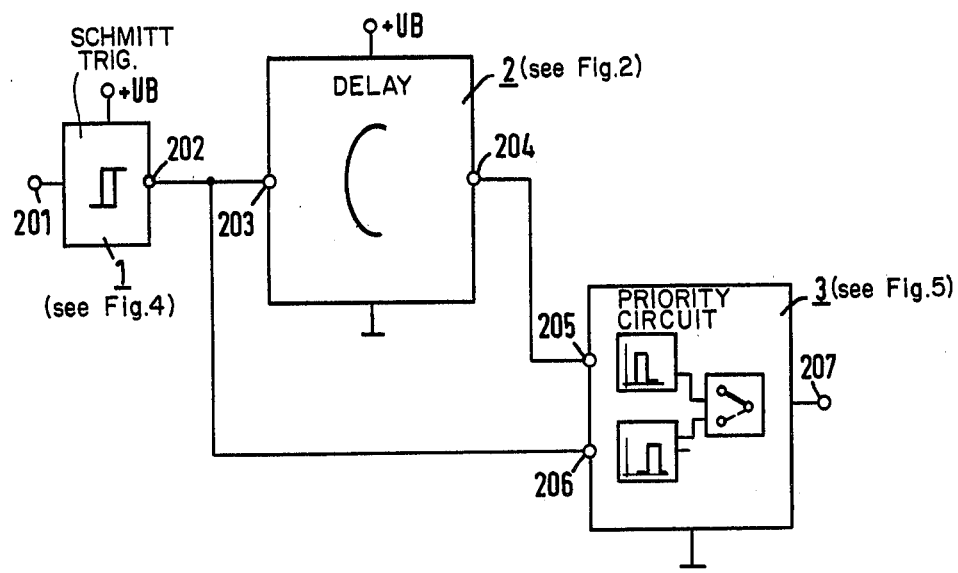
FIG. 1 illustrates in a schematic block diagram, the electronic arrangement for idling stabilization; consisting essentially of a delay device which has a Schmitt-trigger connected to the input thereof, and of a priority circuit.
Figure 12:
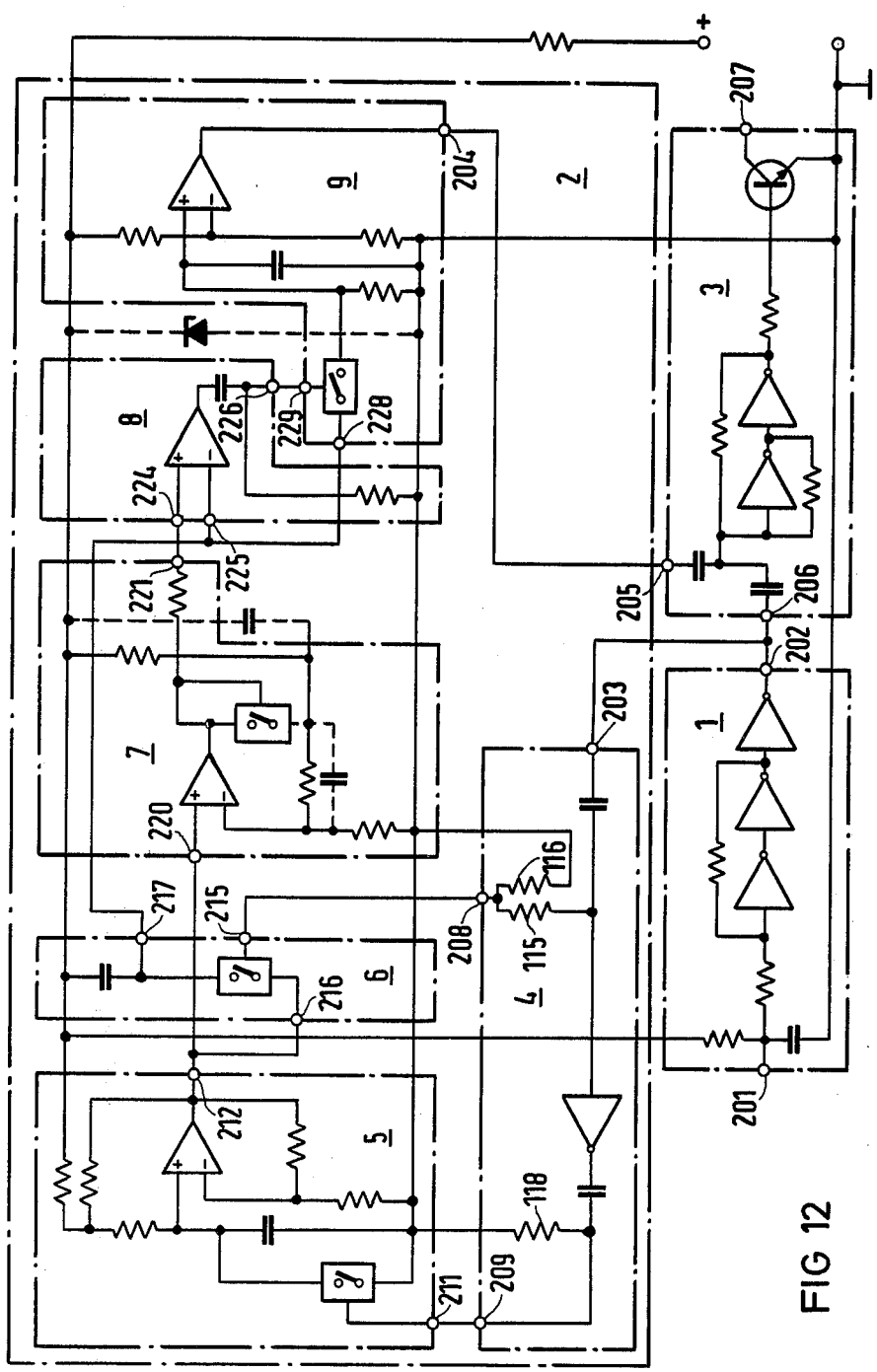
FIG. 12 illustrates an overall schematic diagram of the electronic arrangement for idling stabilization with additional constructional components for the voltage supply.

The exemplary embodiments are now explained in detail hereinbelow;

The electronic arrangement for idling stabilization pursuant to FIG. 1 consists of a Schmitt-trigger with an inverter, the element 1, as well as a delay device 2 and a priority circuit 3 (FIG. 12 can also be referred to for a more detailed schematic diagram of the electronic arrangement for idling stabilization). The Schmitt-trigger with inverter, element 1, includes the input terminal 201 and the output terminal 202. The delay device 2 has the input terminal 203 and the output terminal 204. The priority circuit 3 includes the input terminals 205 and 206, as well as the output terminal 207. The network is completed by the operating voltage UB, in actual practice a positive operating voltage and through a ground potential. When the delay device emits a signal at its output 204, the priority circuit conducts a signal to its output 207. When the delay device 2 does not emit a signal at its output 204, then the priority circuit transmits the signal from the output 202 to its output 207. Within the stabilization range, the delay device 2 emits a signal at its output 204. The Schmitt-trigger with inverter 1 merely serves, in a known manner, to clearly shape the signal present at input 201 from the signal transmitter.

Figure 2:
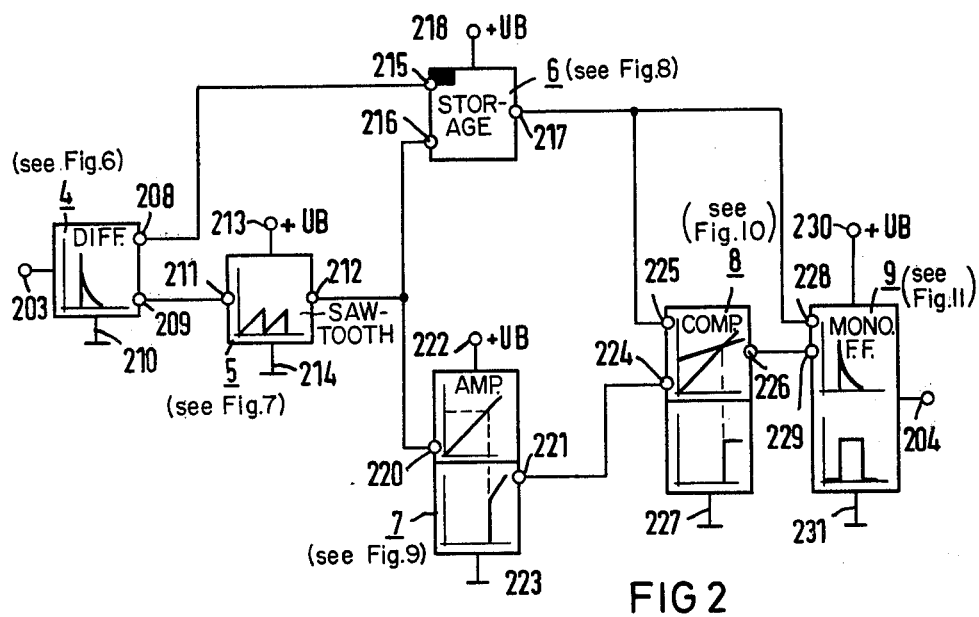
FIG. 2 illustrates, in a schematic block circuit diagram, the delay device for the arrangement for idling stabilization pursuant to FIG. 1.

The delay device 2 in the exemplary embodiment pursuant to FIG. 2, consists essentially of the following constructional elements:
a differentiating element 4,
a sawtooth generator 5,
a storage circuit 6 which can include a storage element such as a capacitor
an amplifier with threshold switch, element 7,
a comparator with a differentiating element, element 8,
and also a monostable flip flop 9.

The differentiating element 4 includes the input 203 and two outputs, 208 as well as 209. The connection to ground is identified by reference numeral 210. The sawtooth generator 5 has the input 211 and the output 212, as well as the connection 213 for the operating voltage and the connection 214 to ground. The storage circuit 6 for storing of the maximum value of the sawtooth includes the inputs 215 and 216, as well as the output 217. The connection for operating voltage is designated with reference numeral 218. The amplifier with threshold switch 7 includes the input 220, the output 221, as well as the connection 222 for operating voltage and the connection 223 to ground, respectively, earth. The comparator with differentiating element 8, includes the inputs 225 and 224, the output 226, as well as the connection 227 to ground. The monostable flip flop 9 includes the inputs 228 and 229, as well as the output 204. At connection 230 there is present the operating voltage and at the connection 231 this leads to ground.

Figure 3:
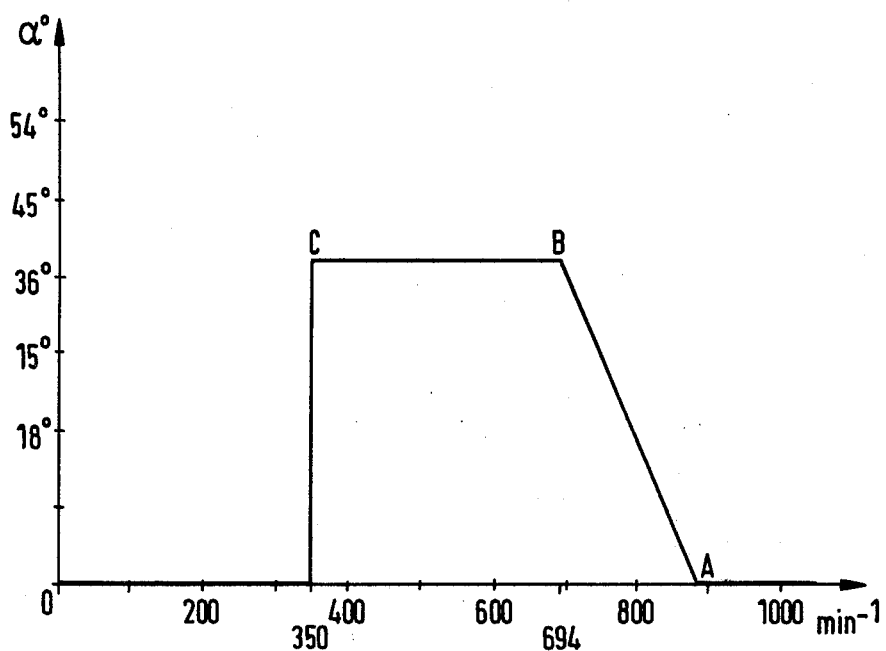
FIG. 3 provides a diagrammatic illustration for the operational characteristics line, in which the ignition advance is measured on the ordinate in angular degrees as measured on the crankshaft and the abscissa represents the engine rotational speeds.

The operational characteristics line in the schematic pursuant to FIG. 3 evidences within the stabilization region the linearly rising side from A to B at a constant delay time and increasing advance ignition, and a level plateau region B C with an increasing delay time and a constant advance ignition.

Figure 4:
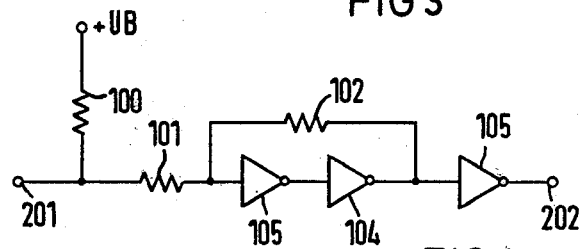
FIG. 4 illustrates the construction of the Schmitt-trigger with inverter.

Set forth hereinbelow are exemplary embodiments of the construction of the individual circuit elements on the basis of FIGS. 4 through 11:

The supply voltage plus UB for a Schmitt-trigger with an afterconnected inverter, 1, pursuant to FIG. 4, is present at a resistor 100 for correlation with the output of a resonance transmitter employed, for example, as a signal transmitter for the ignition spark formation with an open collector output. At the side of the resistor 100 remote from the battery voltage there is located the input terminal 201, which is connected with the actual part of the Schmitt-trigger. It consists of a resistor 101 and a parallel circuit located in series of resistor 102 and two inverters 103 and 104 here positioned behind each other in the parallel branch. The parallel circuit has a further inverter 105 connected to the output thereof which facilitates that one can operate in the electronic idling stabilization with differentiating elements. The output of the Schmitt-trigger is designated with reference numeral 202.

Figure 5:
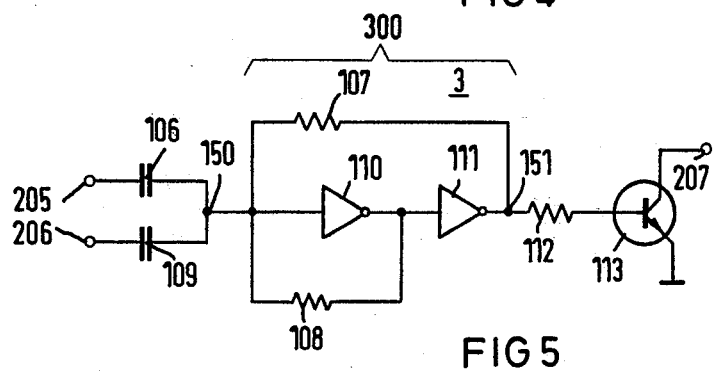
FIG. 5 illustrates an exemplary embodiment of the priority circuit.

The priority circuit 3 with the input terminals 205 and 206 and the output terminal 207 is constructed, pursuant to the embodiment of FIG. 5, through a first differentiating element which, in turn, is formed through an ohmic resistor, a condenser 106, and operative resistors located in parallel at its output, the resistors 107 and 108, and a second differentiating element which is formed by an ohmic resistor, a condenser 109, and then again by operative resistors located at its output, the resistors 107 and 108. The resistors 107 and 108 form, together with two inverters 110 and 111, a bistable flip flop 300 whose input is the terminal point 150 and whose output is the terminal point 151. The resistor 107 lies in parallel to the inverters 110 and 111 which are arranged in series. The resistor 108 is arranged in parallel to the inverter 110. At equally large resistors 107 and 108 the input 109 is located at mid-potential relative to the supply voltage which, in a usual manner, is to be assumed present at the inverters 110, 111. The bistable flip flop 300 has a resistor 112 and a transistor 113 in a so-called open-collector circuit connected to the output thereof in order to allow for correlation to a transistor ignition. These elements, resistor 112 and transistor 113 are not significant to the manner of operation of the electronic idling stabilization. The output terminal 207 can hereby also be assumed to be ahead of the then lacking resistor 112.

Figure 6:
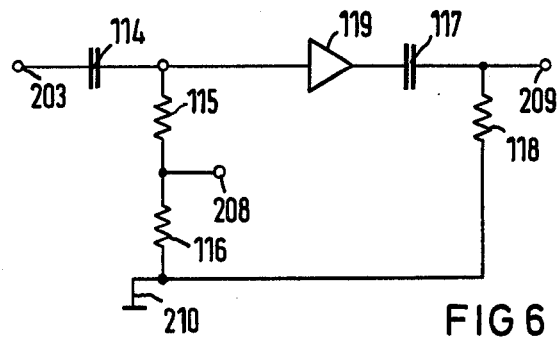
FIG. 6 illustrates a preferred embodiment of the differentiating element, the input of the delay device.

The elements of the delay device 2 pursuant to FIG. 1, with the input terminal 203 and the output terminal 204 are as effectuated in the exemplary embodiment as follows:

The differentiating element 4, pursuant to FIG. 6, with the input terminal 203 includes two output terminals, 208 for a first needle pulse, and 209 for a shortly thereafter following second needle pulse. The differentiating element 4 consists essentially basically of a condenser 114 and two in series connected resistors 115 and 116 which are connected to ground at the terminal 210. The connector terminal 208 lies between the resistors 115 and 116. A second differentiating element with the condenser 117 and the resistor 118 which is connected to ground is coupled to the first differentiating element through an inverter 119. When at the first differentiating element behind the condenser 114 the formed needle pulse drops off, then the output of the inverter moves into the high condition, which is reshaped through the second differentiating element into a needle pulse. Thereafter there is also present at the output terminal 208 a first needle pulse, and shortly thereafter, when the first needle pulse has dropped off, a second needle pulse at the output terminal 209.

Figure 7:
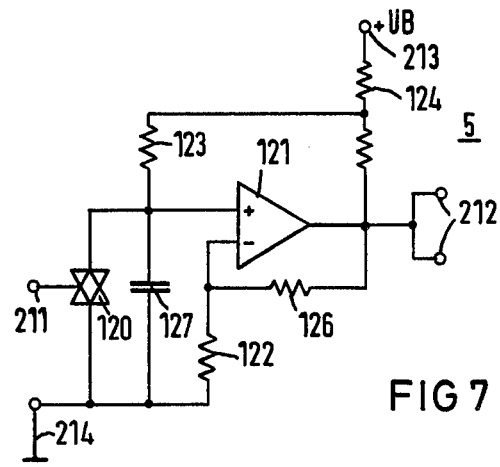
FIG. 7 illustrates an exemplary embodiment of the sawtooth generator.

The sawtooth generator 5, i.e. the delay device 2, with the input terminal 211, the output terminal 212, and the terminal 213 for the connection to the voltage supply, for example plus UB, and the terminal 214 for ground potential is effectuated in the embodiment pursuant to FIG. 7 as follows:

The input terminal 211 is connected with the control input of an electronic switch 120, in the exemplary embodiment a CMOS component, a so-called bilateral switch. The electronic switch 120 is located in the input circuit of an operational amplifier 121 and namely, at the non-inverting input. The inverting input is connected to ground through the resistor 122 by means of the terminal 214. The illustrated wiring of the operational amplifier 121 with the resistors 123, 124, 125, 126 and 122, as well as with the condenser 127 permits the operational amplifier to operate as a sawtooth generator. When a needle pulse appears at the input terminal 211, then the electronic switch 120 becomes conductive and the condenser 127 discharged, whereby the operational amplifier 127 is set to the minimum voltage, in effect to zero. Triggered thereby is the formation of a sawtooth. This procedure repeats itself upon the incidence of the subsequent needle pulse.

Figure 8:
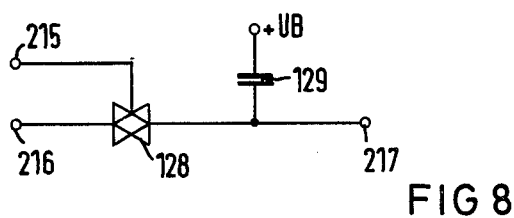
FIG. 8 illustrates an exemplary embodiment of the storage.

The storage 6 of the delay device 2, with the input terminals 215 and 216 and the output terminal 217, as well as the terminal 218 for connection of the supply voltage, is formed in the exemplary embodiment pursuant to FIG. 8 through an electronic switch 128, for example, a CMOS switch, and a condenser 129. Proceeding from the input terminal 216, the electronic switch 128 with the condenser 129 lies in series with the terminal 218 for the supply voltage. The input terminal 215 leads to the control input of the electronic switch 128. Effected between the switch 128 and the condenser 129 is the pickup to the output terminal 217. The input terminal 215 receives the take-over command and the input terminal 216 operates as storage input as long as the take-over command is present at the input terminal. When a positive needle pulse is present at the input terminal 215, then the electronic switch 128 is controlled to be conductive and a voltage which is present at the input terminal 216 charges the condenser 129 over so that the information which is present at the input terminal 216 is read into the storage in the form of a voltage level.

Figure 9:
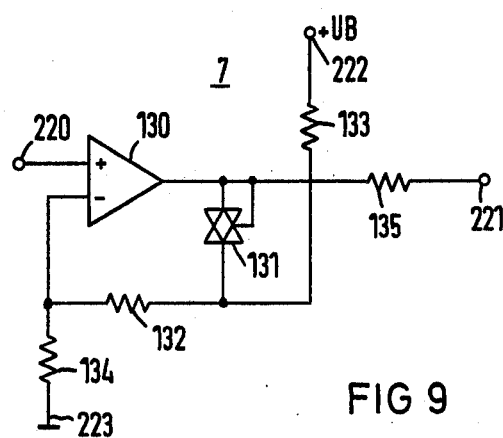
FIG. 9 illustrates a construction of the amplifier with a threshold switch.

The amplifier with the threshold switch, element 7 of the delay device 2, has pursuant to FIG. 9 the input terminal 220 and the output terminal 221, as well as the terminal 222 for connection to supply voltage, and the terminal 223 to ground. The input terminal 220 is connected with the non-inverting input of an operational amplifier 130. The output of the operational amplifier 130 is coupled back to the inverting input through an electronically controlled switch 131, in the exemplary embodiment as CMOS switch, and a resistor 132. Through the resistors 133, 132 and the resistor 134, between the supply voltage and ground, there is formed between resistors 132 and 134 the pickup for a voltage divider. The latter is connected to the inverting input of the operational amplifier 130. Thereby there is set at the operational amplifier 130 a threshold value of $$UB \times \frac{R\,134}{R\,134 + R\,132 + R\,133}.$$

When the voltage present at the input terminal 220 reaches the predetermined threshold value, then the operational amplifier 130 is actuated, so that the switch 131 is controlled to be conductive. The operational amplifier 130 now operating as a non-inverting proportional amplifier has the amplification factor V130

$$V130 = 1 + \frac{R132}{R134}.$$

In the exemplary embodiment there is also provided a resistor 135 intermediate the output of the operational amplifier 130 and the output terminal 221.

Figure 10:
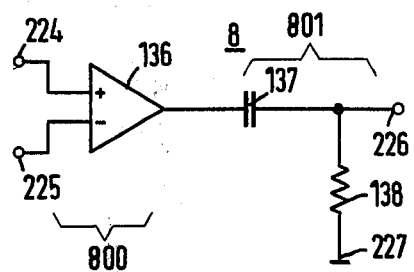
FIG. 10 illustrates a construction for the comparator with differentiating element.

The comparator 800 with the differentiating element 801, component group 8 of the delay unit 2, pursuant to FIG. 10 includes the input terminals 224 and 225, as well as the output terminal 226 and a terminal 227 for connection to ground. An operational amplifier 136 is operated as a comparator; connected to the output thereof is a differentiating element. The differentiating element consists of a condenser 137 and a resistor 138. The input terminal 225 is connected with the non-inverting input and the input terminal 225 with the inverting input of the operational amplifier 136. Formed intermediate the condenser 137 and the resistor 138 is a connection to the output terminal 226. When the voltage present at the input terminal 224 exceeds the voltage present at the input terminal 225, then the comparator is switched through so that a high-signal is present at its output. The positive side, during transition to the high-signal, at the output of the of the operational amplifier 136 is reshaped by the differentiating element into a needle pulse which stands available at the output terminal 226.

Figure 11:
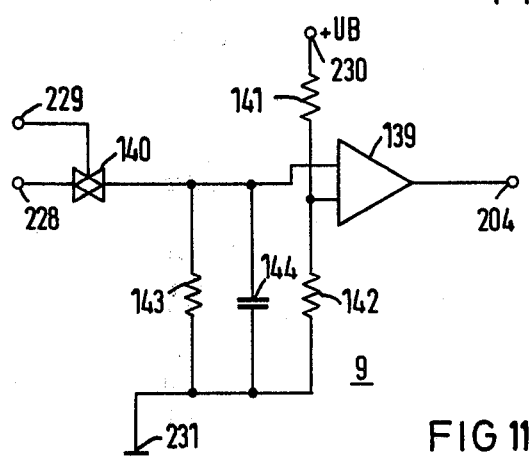
FIG. 11 illustrates a construction of the monostable flip flop.

The monostable flip flop 9 pursuant to FIG. 11, the delay device 2 with the input terminals 228 and 229 and the output terminal 204 as well as the terminals 230 for connection to supply voltage, and terminal 231 for connection to ground is equipped so as to emit an output signal of adjustable duration. Connected to the non-inverting input of an operational amplifier 139 through an electronically controlled switch 140, in this embodiment a CMOS switch, is the input terminal 228. The signal which is here present from the storage acts as a time setter. Connected at the control input of the switch 140 is the connector terminal 229 which acts as a trigger unit. Hereby there is also determined at which point in time a signal stands available out the output. The inverting input of the operational amplifier 139 is subjected to a threshold value through the resistors 141 and 142 which operate as voltage dividers. The non-inverting input of the operational amplifier 139 lies connected to ground through the condenser 144 and a herewith parallel arranged resistor 143.

When the input terminal 229 of the switch 140 acting as a trigger input is conductively controlled, then a voltage level present at the input terminl 228 as a time determinate can charge the condenser 144. Upon the charging of the condenser 144, the output of the operational amplifier 139 is converted into its high-condition. With an attenuating triggering signal at the input 259, the switch 140 will open and the condenser 144 can discharge across the resistor 143. When one falls below the set threshold value at the inverting input of the operational amplifier then the output of the operational amplifier 139 drops back into its low-condition.

The duration of the high-signal is proportional to the voltage introduced into the condenser 144. This introduced voltage is, in turn, proportional to the periodic interval of the signal transmitter for the condition spark formation connected at the input side of the idling stabilization. Thus, the duration tH of the high-signal is proportional to the duration of period TS of the signal transmitter. Thereby, also the duration tL of the low-signal is proportional to the period duration TS. As a result also the keying ratio T is constant from the duration of the high-signal to the duration of the low-signal. Then $tH = k1 \times TS$; $tL = k2 \times TS$ and thus $$T = \frac{tH}{tL} = \frac{k1 \times TS}{k2 \times TS} = \frac{k1}{k2} = \text{constant.}$$

Figure 13:
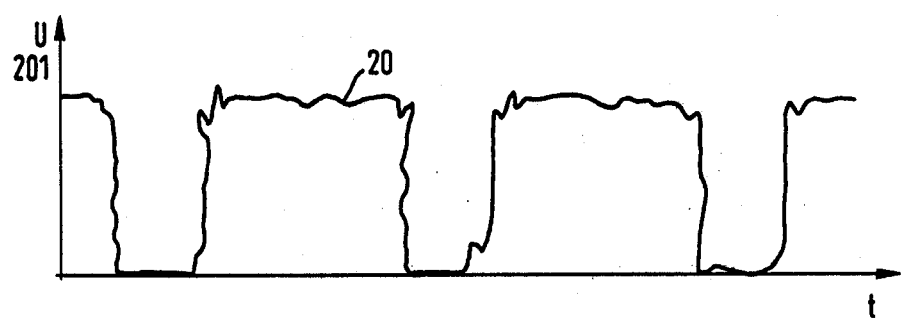
FIG. 13 illustrates a pulse sequence emanating from the signal transmitter for ignition spark formation; in the illustration there is plotted on the ordinate the voltage at the output of the signal transmitter and the time is recorded on the abscissa.
Figure 14:
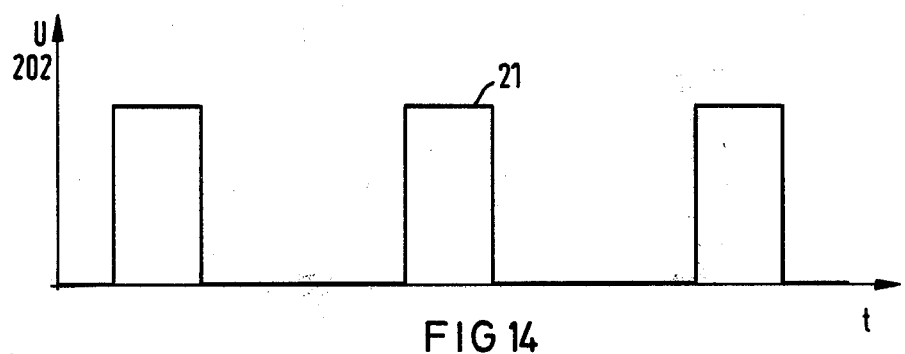
FIG. 14 illustrates the mode in which the voltage pursuant to FIG. 13 is rendered available through the Schmitt-trigger at its output.
Figure 20:
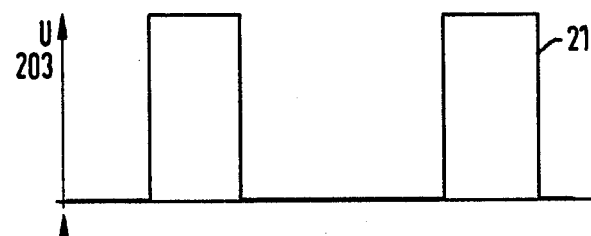
FIGS. 20 through 22, which act in combination, illustrate the manner in which the differentiating element pursuant to FIG. 6 forms at the positive side at the output of the Schmitt-trigger with inverter, two needle pulses closely following each other in time.
Figure 21:
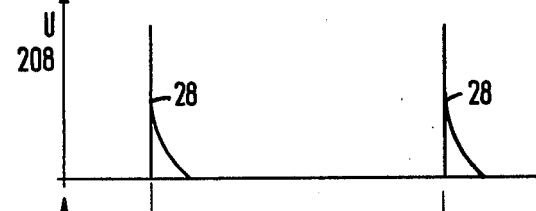
Figure 22:
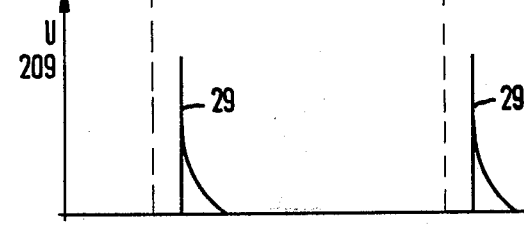
Figure 23:
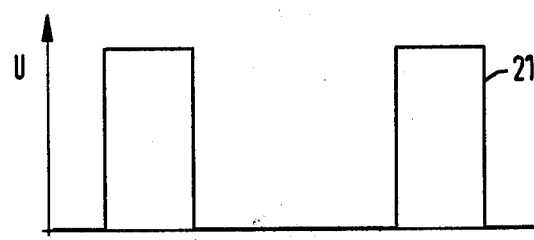
FIGS. 23 and 24, which act in combination, illustrate the manner in which the sawtooth voltage in the sawtooth generator depends upon the signal at the input of the delay device; the positive side always sets the sawtooth generator to zero.
Figure 24:
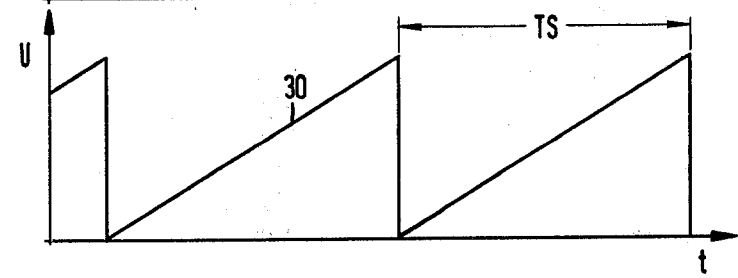

Hereinbelow is described the mode of operation of the device for the electronic idling stabilization:

When there is present at the input of the electronic arrangement for idling stabilization, a signal from the signal transmitter for the ignition spark formation, for instance pursuant to FIG. 13, the signal from the input stage, in the exemplary embodiment pursuant to FIGS. 1 and 4 a Schmitt-trigger with inverter, component group 1, is cleared of disturbing influences so that there is obtained a signal pursuant to FIG. 14. In this and in the following schematic representations there is always illustrated the time on the abscissa and the signal as voltage on the ordinate. In FIG. 13 there is thus plotted the voltage of the signal from the signal transmitter, the input voltage U201 with the cycle 20. It is present at the input terminal 201 of the arrangement for idling stabilization. At the output 202 of the input stage, in essence at the output of the Schmitt-trigger with inverter 1, the voltage 202 stands available with the cycle 21 pursuant to FIG. 14. When the operative mode of the delay device 2 pursuant to FIG. 1 is initially combined there is then delayed a voltage U 202, pursuant to FIG. 15, so that the first differentiating element of the priority circuit 3, pursuant to FIGS. 1 and 5, with the input 205, renders available at its output the voltage UD1 pursuant to FIG. 16 with the cycle 22. With respect to the undelayed contemplated signal pursuant to FIG. 15, in effect, at the output of the second differentiating element of the priority circuit 3 pursuant to FIG. 17, there is produced a timewise delay tv and an advance ignition at the time tf. The voltage UD2 pursuant to FIG. 17 at the output of the second differentiating element of the priority circuit 3, whose input is designated with 206, has the cycle 23. At the input 150 of the flip flop of the priority circuit 3 pursuant to FIG. 5 there is then present the voltage U pursuant to FIG. 18. The bistable flip flop of the priority circuit is set into the high-condition through the first positive differentiating peak 24 and, by means of the first negative peak, is displaced back into the low-condition. The second positive signal peak 26 and the second negative signal peak 27 will then currently remain ineffective. Accordingly, there is maintained the period TS of the signal transmitter, pursuant to FIG. 15, as may be ascertained from FIG. 19. Plotted herein on the ordinate is the voltage UL as it is emitted at the output of the electronic arrangement for idling stabilization at an operative point within the stabilization range.

Externally of the stabilization range there is currently present at the input of the flip flop of the priority circuitry only the positive signal 26 and the negative signal 27 so that there is obtained at the output of the flip flop a signal cycle corresponding to 21 pursuant to FIG. 15, in effect, undelayed. Externally of the stabilization range there is thus further transmitted unchanged the signal from the signal transmitter in its information content.

Within the stabilization range there is achieved an advance ignition at the time $tf = TS - tv$. With respect to the undelayed contemplated signal there are then available advanced signals at the output of the arrangement for idling stabilization. Through the negative side, signals from the signal transmitter, respectively through the positive side of the inverted signal, as generated through the input stage, namely through a Schmitt-trigger with inverter, there is effected the initiation of the ignition spark.

The manner of operation of the delay device 2 pursuant to FIG. 1, which is shown in greater detail in FIG. 2, is now elucidated pursuant to the description in FIGS. 20 through 38.

The voltage from the output 202 of the input stage is present at the input 203 of the delay device as U203. Its cycle 21 is again illustrated in FIG. 20. The differentiating element 4 produces in this exemplary embodiment first needle pulses 28 pursuant to FIG. 21, which are emitted at output 208, and at a short time interval thereafter, second needle pulses 29 pursuant to FIG. 22, which are emitted at the output 209. By means of the needle pulses pursuant to FIG. 22, from the positive side of signal U203 at the output of the input stage, in the exemplary embodiment the Schmitt-trigger with inverter, there is triggered the sawtooth generator 5 which generates the voltage U with the cycle pursuant to FIG. 24. The duration of the sawtooth voltage is a linear representation of the time cycle during the period of the signal from the signal transmitter, in effect, the signal U at the output 202. The period TS can thus also be understood as being the period TS of the sawtooth signal.

In FIG. 25 there is again represented the cycle 30 of the sawtooth voltage. This voltage is present at the input 220 of the amplifier with the threshold switch, element 7. The threshold value is designated with reference numeral 31. At the output 221 there is then available a voltage cycle 32 pursuant to FIG. 26.

The sawtooth voltage at output 212 of the sawtooth generator 5 is also conveyed to the storage 6, in which there is stored the current maximum value of the sawtooth voltage. Through the needle pulse U208 pursuant to FIG. 21 there is assumed the instantaneous values of the sawtooth in the storage 6. However, since this needle pulse occurs immediately ahead of the zero setting of the sawtooth, this instantaneous value corresponds to the maximum value of the sawtooth. This maximum value is directly proportional to the duration of the period of the signal from the signal transmitter for the ignition spark formation and thus is inversely proportional to engine rotational speed. The maximum value is stored and stands available up to the zero setting with the next sawtooth at output 217.

The threshold value which is set at the threshold of the amplifier with the threshold switch, component group 7, corresponds to a predetermined delay time tv. When the sawtooth voltage 30, due to a shorter period cycle ts does not reach the threshold value 31, then no signal will be present at output 221.

The comparator 800 with the differentiating element 801, component group 8, however, delivers a signal at output 226 only when the voltage at the input 224 reaches or exceeds the stored maximum sawtooth voltage which is present at input 225. In the just described instance, the stabilization arrangement operates externally of the stabilization range.

When the period duration TS of the signal from the signal transmitter for ignition spark formation serving as the input signal corresponding to the period duration of the sawtooth impulse, is so large that the sawtooth voltage reaches the set threshold value, then the comparator 8 receives an input signal at its input 224. The beginning of the stabilization range is illustrated in FIGS. 27 through 30.

For the input voltage 21 pursuant to FIG. 27 which is present at input 203, the sawtooth voltage 30 pursuant to FIG. 28 can just reach the preset threshold value 31. Due to the amplification through the amplifier with the threshold switch of the component group 7, the voltage 31 at output 221 exceeds the maximum voltage 33 of the sawtooth voltage 30 which is stored in the storage 6. This is illustrated in FIG. 29. In the component group 8, the comparator 800 thus emits a high-signal, to which the differentiating element 801 forms a needle pulse which is present at the input 229 of the monostable flip flop, component group 9. This forms an output signal with constant keying ratio and the monostable time tm, as is illustrated in FIG. 30.

Since the threshold value 31 is always reached after the same time, independently as to which period cycle is evidenced by the sawtooth, there is obtained a constant delay and at an increasing period cycle of the sawtooth voltage, in effect at a reducing rotational speed, a linearly increasing advance ignition, as can be seen, for example, from a comparison of FIGS. 15 and 16.

Figure 31:
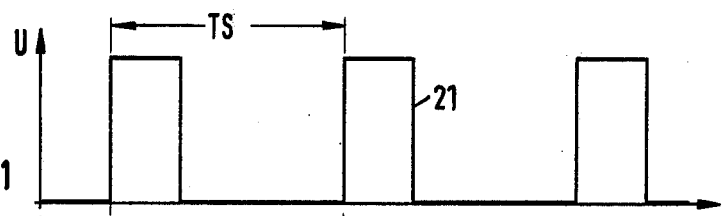
Figure 32:
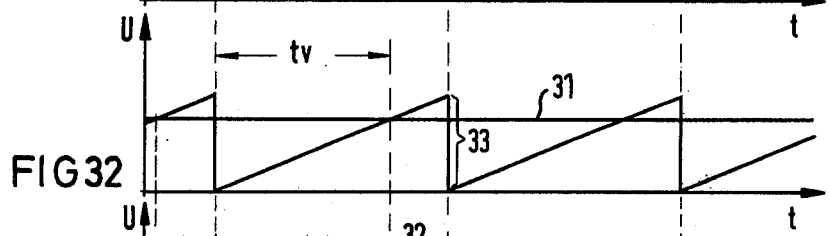
Figure 33:
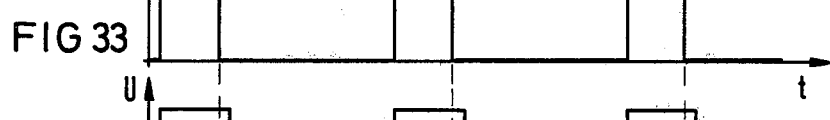
Figure 34:
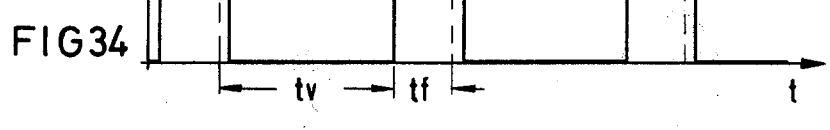
Figure 35:
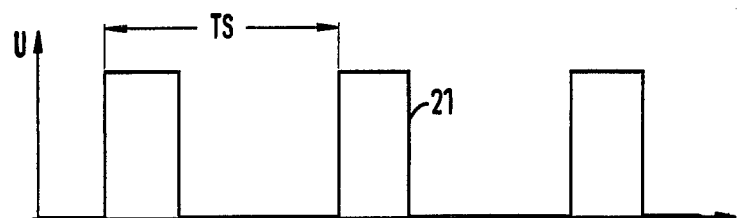
FIGS. 35 through 38, which act in combination, represent the interplay of the units of the delay device in the operating range of increasing delay and thereby of constant advance ignition.
Figure 36:
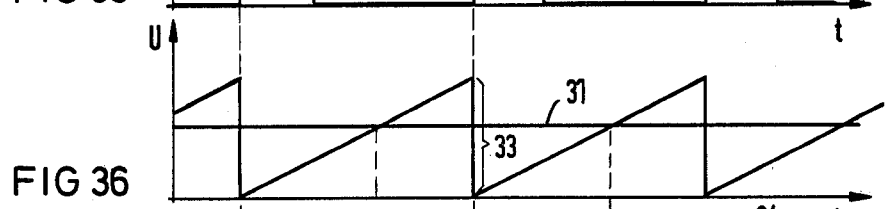

When the period cycle of the input signal ts and, correspondingly, the period cycle of the sawtooth is so large that the voltage which has been amplified by the amplifier in component group 7 is just as large as the maximum sawtooth voltage, then in FIG. 3 there has been reached the upper point B of constant delay time and linearly increasing advance ignition. This is illustrated in FIGS. 31 through 34. The period cycle ts in FIG. 31 is to be assumed as larger than that in FIG. 27; only for reasons of illustration has it been shown as equal. Upon the actuation of the amplifier in component group 7 can the comparator in component group 8 determine that the maximum sawtooth voltage has been reached and the priority circuit is subjected to a delayed signal so that the signal cycle is reached pursuant to FIG. 34. With respect to the undelayed signal 21, at a delay period of tv this corresponds to an advance ignition tf.

At a still greater durational period TS of the input signal, the maximum sawtooth voltage increases further and, upon reaching of the threshold value, the amplifier voltage lies below the maximum sawtooth voltage. The operating point now lies in the plateau region pursuant to FIG. 3, in effect between points B and C. The manner of function is illustrated in FIGS. 35 through 38. Due to reasons of illustration the period duration TS of the input voltage is again retained, although it is actually greater than in FIG. 31. The amplified voltage 32 pursuant to FIG. 37 upon reaching of the threshold value 31 pursuant to FIG. 36, lies below the maximum value 33 of the sawtooth voltage. Therefore some time passes until the amplified voltage 32 reaches the maximum sawtooth voltage 33 and the comparator of the component group 8 emits a signal with the result that the priority circuit 3 obtains a signal at its input 205.

Figure 37:
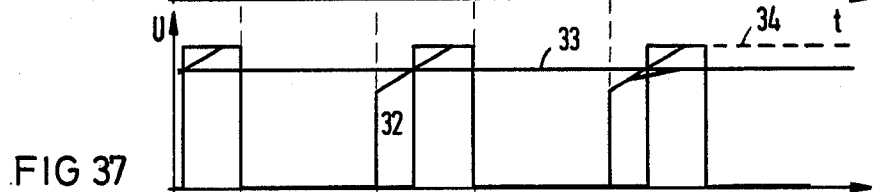
Figure 38:
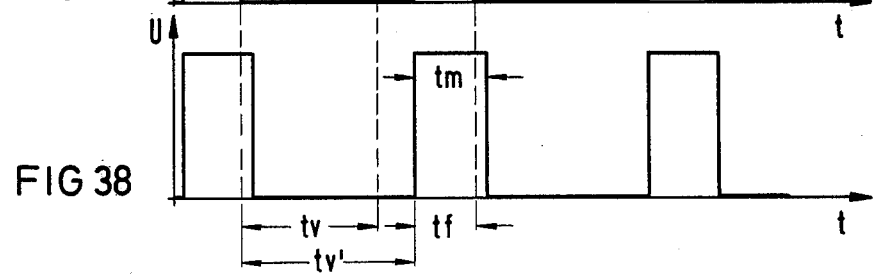

In FIG. 37 there is finally illustrated a limiting voltage 34. When the maximum value 33 of the sawtooth voltage lies above this limiting voltage, then the amplifier with the threshold switch, component group 7, can no longer emit a signal. When the limiting voltage is reached, then the amplifier can no longer reach the maximum sawtooth voltage, which corresponds the plateau drop off in the operational characteristics line pursuant to FIG. 3 at point C.

The limiting voltage 34 can generally be understood as a second threshold value. It is essential that commencing from the activation of the amplifier in the component group 7 up to the actuation of the comparator in the component group 8, there is traversed an additional delay time period t′−tv. This tv′ is by so much larger than tv, pursuant to FIGS. 31 through 34, the more time there is traversed towards reaching of the maximum sawtooth voltage 33 through the amplified voltage 32. As is illustrated on the basis of FIG. 38, the operative point now lies in a region of increasing delay time. It is, however, essential that due to the indicated circuitry there is achieved a constant advance ignition angle $\alpha$, wherein $$\alpha = \frac{180}{TS} \times tf = \text{constant}.$$

When the amplifier has the amplification factor k, there is obtained between the advance ignition, measured in angular degrees $\alpha$ and the amplification, the relationship $$k = \frac{TS}{tv'} = \frac{180°}{180° - \alpha} \text{ Plateau}$$

The advance ignition $\alpha$ in degrees corresponds to a predetermined plateau height in FIG. 3.

When, in the component group 8, the comparator 800 a signal at the input 224 determines that the maximum value of the saw tooth voltage at input 225 has been reached or exceeded, then its differentiating element 801 emits a needle pulse which is present at the input 229 of the monostable flip flop 9. The monostable flip flop then delivers a signal of constant keying ratio T whose monostable time tm depends upon the maximum value of the sawtooth voltage from the storage 6. The differentiating element 801 of the component group 8 delivers during the transition of the comparator 800 into its high-condition a needle pulse to the positive side, which closes the controllable switch through the input 229 of the monostable flip flop 9. The keying ratio can be constantly set in a desired manner, as can be illustrated based on the following equations:

From $T = \dfrac{tm}{TS - tm}$ ; $tm = k \times TS$ there results that $\dfrac{k \times TS}{TS - k \times TS} = \dfrac{k}{1 - k} = k'$, in effect, constant.

What is claimed is:

1. In an electronic arrangement for idling stabilization between a signal transmitter for ignition spark formation and an ignition device for internal combustion engines, in which for a falling engine rotational speed the ignition timepoint is advanced below a first engine rotational speed (A) at the high end of a stabilization range until a second intermediate engine rotational speed (B) in the stabilization range is reached, said advance in ignition being attained by a delay circuit supplying a constant delay signal between said first and second engine rotational speeds, and then the ignition timepoint is maintained constant until a third engine rotational speed (C) at the low end of the stabilization range is reached, said constant ignition timepoint being attained by said delay circuit supplying an increased delay signal between said second and third engine rotational speeds, and wherein undelayed pulses are generated outside of the stabilization range, said delay circuit including a sawtooth generator triggered by an edge of a pulse from said signal transmitter, said sawtooth generator being coupled at the output side thereof to a storage means and an amplifier, coupled parallel to said storage means, having an element non-linear with respect to voltage in the feedback branch of the amplifier, a comparator means coupled to the outputs of said amplifier and said storage means, for detecting when the signal from said amplifier exceeds the value stored in said storage means and generating a signal which is coupled to said ignition device.

2. Arrangement as claimed in claim 1, further comprising a differentiating circuit coupled to the output of said comparator; a monostable flip flop coupled to the output of said comparator, said flip flop including a controllable switch having a control input coupled to the output of said comparator and also having an input coupled to said storage means, the outputs of said monostable flip flop forming the outputs of said delay circuit which is coupled to the input of a priority circuit, a second input of which is coupled to the input of the electronic arrangement for idling stabilization, whereby the priority circuit upon detecting a signal at its input terminal from the monostable flip flop conducts that signal to the output thereof, and in the absence of a signal from said monostable flip flop couples the input signal of the electronic idling stabilization arrangement to the output thereof.

3. Arrangement as claimed in claim 1 or 2, further comprising a differentiating circuit coupled between the input of the electronic idling stabilization arrangement and both said storage means and said sawtooth generator.

4. Arrangement as claimed in claim 2, wherein said priority circuit includes two differentiating elements including operative resistors, and two inverters coupled to said operative resistors to form a bistable flip flop.

* * * * *